US011770066B2

(12) United States Patent
Liu et al.

(10) Patent No.: US 11,770,066 B2
(45) Date of Patent: Sep. 26, 2023

(54) PROTECTION CIRCUITRY FOR POWER CONVERTERS

(71) Applicant: Hamilton Sundstrand Corporation, Charlotte, NC (US)

(72) Inventors: Bo Liu, Vernon, CT (US); Yongduk Lee, Vernon, CT (US); Xin Wu, Glastonbury, CT (US); Suman Dwari, East Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/345,548

(22) Filed: Jun. 11, 2021

(65) Prior Publication Data

US 2022/0399800 A1     Dec. 15, 2022

(51) Int. Cl.
*H02M 1/32* (2007.01)
*H02M 7/217* (2006.01)
*H02M 7/537* (2006.01)

(52) U.S. Cl.
CPC ............ *H02M 1/32* (2013.01); *H02M 7/217* (2013.01); *H02M 7/537* (2013.01)

(58) Field of Classification Search
CPC ......... H02M 1/32; H02M 7/217; H02M 7/537
See application file for complete search history.

(56) References Cited

U.S. PATENT DOCUMENTS

| 5,179,510 A | 1/1993 | Tokiwa et al. |
| 5,687,049 A | 11/1997 | Mangtani |
| 6,031,702 A | 2/2000 | Williams |
| 6,392,907 B1 | 5/2002 | Ichikawa |
| 8,749,939 B2 | 6/2014 | Tran et al. |
| 10,491,096 B2 | 11/2019 | Ramabhadran et al. |
| 10,910,957 B1 | 2/2021 | Shenoy et al. |
| 2003/0086231 A1 | 5/2003 | Asaeda et al. |
| 2017/0016655 A1* | 1/2017 | Shinomoto ............. H02M 7/06 |
| 2017/0214335 A1 | 7/2017 | Basic et al. |
| 2018/0034362 A1 | 2/2018 | Kubouchi et al. |
| 2021/0175704 A1* | 6/2021 | Askan ..................... H02H 7/10 |

FOREIGN PATENT DOCUMENTS

| CN | 103326324 A | 9/2013 |
| EP | 3787166 A1 | 3/2021 |
| IN | 201721006543 A | 5/2017 |
| IN | 202021037188 A | 12/2020 |
| JP | 2002112452 A | 4/2002 |
| JP | 2003199352 A | 7/2003 |

OTHER PUBLICATIONS

Extended European Search Report issued by Examiner Philippe Riehl, of the European Patent Office, dated Oct. 20, 2022, in corresponding European Patent Application No. 22178766.6.

* cited by examiner

*Primary Examiner* — Rafael O De Leon Domenech
(74) *Attorney, Agent, or Firm* — Locke Lord LLP; Daniel J. Fiorello; Gabriella D'Angelo

(57) ABSTRACT

A power converter can include a first line, a second line, a capacitor line disposed between the first line and the second line, a first capacitor and a second capacitor connected to the capacitor line in series between the first line and the second line, a midpoint line connected to a midpoint between the first capacitor and the second capacitor, and a protection circuit disposed between the first capacitor and the second capacitor and configured to provide protection to one or more portions of the power converter.

16 Claims, 11 Drawing Sheets

DC Capacitor Pre-Charge

PROTECTION CIRCUITRY FOR POWER CONVERTERS

STATEMENT OF GOVERNMENT RIGHTS

This invention was made with government support under contract no. 80AFRC19C0015 awarded by NASA. The government has certain rights in the invention.

FIELD

This disclosure relates to power converters (e.g., DC/AC inverters).

BACKGROUND

In traditional DC/AC inverter systems (e.g., for systems with a battery supplied motor control and motor system), for example, DC fault current flow cannot be effectively stopped with existing protections immediately. There can be high current flows through the DC capacitors and the power modules/anti-parallel diodes.

High voltage/high current DC circuit breakers may not be readily available, mature, or fast enough. Fault current through power module continues via anti-parallel diode for a while until motor speed drops and AC voltage becomes lower than the DC-link voltage.

Inductor and capacitor resonance causes larger current stress and longer duration. Even if a DC circuit breaker becomes available, it cannot fully protect the faults inside the converter, e.g., DC terminal short, or phase leg shoot-through.

For high power applications, device-level protection circuits such as current desaturation (desat) protection circuit are often needed to protect the expensive devices and power converters and to avoid cascaded failure and damage of other components in the system. Desat circuits are applied in all devices of a converter, which presents a design complexity and increases cost of the system. Each desat protection circuit has a single or limited protection function.

Conventional methods and systems have generally been considered satisfactory for their intended purpose. However, there is still a need in the art for improved protection circuitry for power converters where operational safety and fast protection are desired. The present disclosure provides a solution for this need.

SUMMARY

In accordance with at least one aspect of this disclosure, a power converter can include a first line, a second line, a capacitor line disposed between the first line and the second line, a first capacitor and a second capacitor connected to the capacitor line in series between the first line and the second line, and a midpoint line connected to a midpoint between the first capacitor and the second capacitor. The power converter can also include a protection circuit disposed between the first capacitor and the second capacitor and configured to provide protection to one or more portions of the power converter.

The protection circuit can include a first switch and a second switch connected in series between the first capacitor and the second capacitor. The first switch and second switch can be MOSFETs, for example, or any other suitable switch.

The midpoint line can be connected to the capacitor line between the first switch and the second switch. A first source of the first switch can be connected to the first capacitor and a first drain of the first switch can be connected to the midpoint and the second switch. A second source of the second switch can be connected to the midpoint and the first switch, and a second drain of the second switch is connected to the second capacitor.

The power converter can further include a resistor line connected at a first point, the first point being between the first switch and the first capacitor. The resistor line can also be connected at a second point, the second point being between the second switch and the second capacitor.

The resistor line can have a resistor connected between the first point and the second point. The resistor can be configured to absorb energy and provide ringing damping during a protection transient.

In certain embodiments, the first line can be a positive DC rail, the second line can be a negative DC rail, and the capacitor line can be a DC link capacitor line for an inverter or rectifier. In certain embodiments, the power converter is a DC/AC inverter or AC/DC rectifier. Any other suitable power converter type is contemplated herein.

In accordance with at least one aspect of this disclosure, a power converter can include a first line, a second line, a capacitor line disposed between the first line and the second line, a first capacitor and a second capacitor connected to the capacitor line in series between the first line and the second line, a midpoint line connected to a midpoint between the first capacitor and the second capacitor, and a first switch and a second switch connected in series between the first capacitor and the second capacitor. The power converter can further comprising a midpoint line connected to the capacitor line between the first switch and the second switch.

The first switch and second switch can be MOSFETs. A first source of the first switch can be connected to the first capacitor, and a first drain of the first switch can be connected to the midpoint and the second switch. A second source of the second switch can be connected to the midpoint and the first switch, and a second drain of the second switch can be connected to the second capacitor.

The power converter can include a resistor line connected at a first point, the first point being between the first switch and the first capacitor, and connected at a second point, the second point being between the second switch and the second capacitor. The resistor line can have a resistor connected between the first point and the second point. The resistor can be configured to absorb energy and provide ringing damping during a protection transient. The first line can be a positive DC rail, the second line can be a negative DC rail, and the capacitor line can be a DC link capacitor line for an inverter or rectifier.

In accordance with at least one aspect of this disclosure, a method for providing overvoltage or short circuit protection to a power converter can include sensing an overvoltage or short circuit in at least one portion of the power converter, and opening one or more switches disposed between a plurality of DC link capacitors on a DC link capacitor line in response to the overvoltage or short circuit. Opening one or more switches can include simultaneously opening two switches, a first switch located on a first side of a midpoint of the DC link capacitor line between the plurality of DC link capacitors, and a second switch located on a second side of the midpoint between the plurality of DC link capacitors.

In accordance with at least one aspect of this disclosure, a power converter can include a first line, a second line, a capacitor line disposed between the first line and the second line, at least a first capacitor connected to the capacitor line in series between the first line and the second line, and a protection circuit disposed between the first capacitor and the second line and configured to provide protection to one or more portions of the power converter. The power converter can include a second capacitor disposed on the capacitor line, and a midpoint line connected to a midpoint between the first capacitor and the second capacitor.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
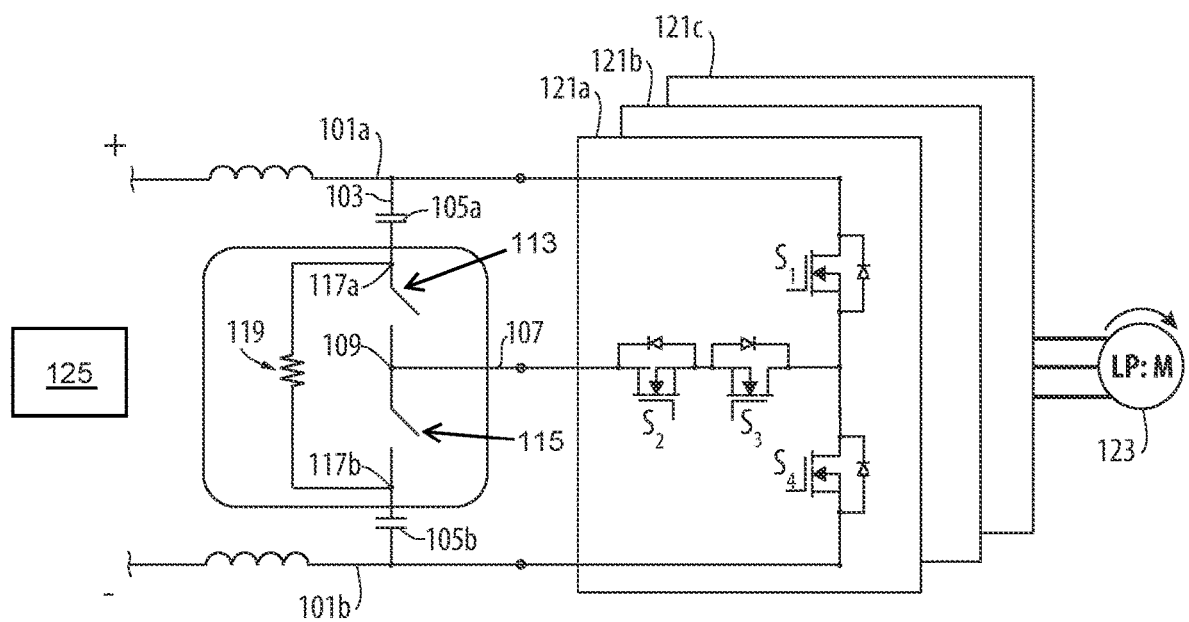
FIG. 1 is a schematic circuit diagram of an embodiment of a three-level AC/DC power converter in accordance with this disclosure, shown having three phases (shown schematically layered) connected to a motor.

Reference will now be made to the drawings wherein like reference numerals identify similar structural features or aspects of the subject disclosure. For purposes of explanation and illustration, and not limitation, an illustrative view of an embodiment of a power converter in accordance with the disclosure is shown in FIG. 1 and is designated generally by reference character 100. Other embodiments and/or aspects of this disclosure are shown in FIGS. 2A-6D. Certain embodiments described herein can be used to provide protection (e.g., overvoltage and/or overcurrent protection) for power converters (e.g., DC/AC converters for electric motor systems).

Referring to FIGS. 1 and 2A, and FIGS. 4 and 5A, in accordance with at least one aspect of this disclosure, a power converter 100, 400 can include a first line 101a, a second line 101b, a capacitor line 103 disposed between the first line 101a and the second line 101b, a first capacitor 105a and a second capacitor 105b connected to the capacitor line 103 in series between the first line 101a and the second line 101b, and a midpoint line 107 connected to a midpoint 109 between the first capacitor 105a and the second capacitor 105b. The power converter 100 can also include a protection circuit 111, 411 disposed between the first capacitor 105a and the second capacitor 105b and configured to provide protection to one or more portions (e.g., other components, e.g., switches as shown, the motor, DC power supply, etc.) of the power converter 100.

The protection circuit 111, 411 can include a first switch 113 and a second switch 115, 415 connected in series between the first capacitor 105a and the second capacitor 105b. In certain converter embodiments, e.g., certain two level converters, the protection circuit may not have a midpoint line and the second switch. Any other suitable circuit arrangement is contemplated herein.

The switches 113, 413, 115, 515 can be any suitable switches configured for any suitable switching function and/or circuit type. For example, as shown in FIGS. 1-3C, the first switch 113 and second switch 115 can be bidirectional switches (e.g., certain embodiments shown in FIG. 2C) configured to allow overcurrent protection and/or overvoltage protection as well as DC link pre-charging.

In certain embodiments, e.g., as shown in FIGS. 4-6C, the first switch 413 and second switch 415 can be MOSFETs. For example, the first switch 413 and the second switch 415 can both be n-channel MOSFETs as shown in FIGS. 4-6C. In certain embodiments, the protection circuit 411 can include a reversely installed half bridge MOSFET leg as shown in FIG. 5A for overcurrent protection. Any other suitable switch configured to provide any suitable response time (e.g., about 1 to 2 microseconds) to provide overvoltage or short circuit protection is contemplated herein.

Figure 4:
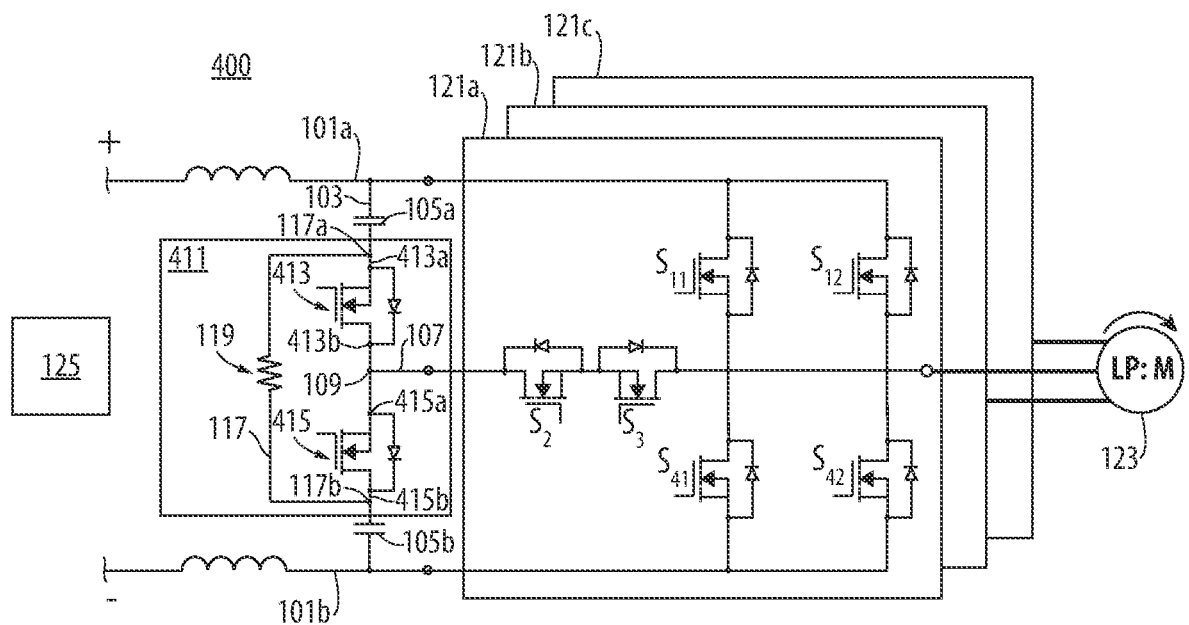
FIG. 4 is a schematic circuit diagram of a power converter in accordance with this disclosure, shown having 3 phases (shown schematically layered) connected to a motor.
Figure 5A:
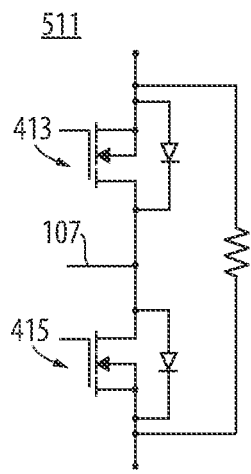
FIG. 5A is a circuit diagram of an embodiment of a protection circuit in accordance with this disclosure as shown in FIG. 4.
Figure 5B:
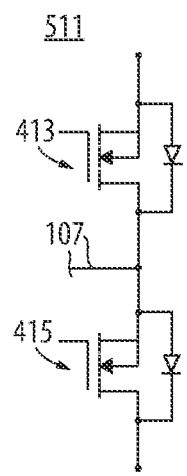
FIG. 5B is a circuit diagram of another embodiment of a protection circuit in accordance with this disclosure, shown without a resistor line.

As shown, in certain embodiments, the midpoint line 107 can be connected to the capacitor line 103 between the first switch 113, 413 and the second switch 115, 415. In certain embodiments, e.g., as shown in FIGS. 4, 5A, and 5B, a first source 413a of the first switch 413 can be connected to the first capacitor 105a, and a first drain 413b of the first switch 413 can be connected to the midpoint 109 and the second switch 415. A second source 415a of the second switch 415 can be connected to the midpoint 109 and the first switch 413, and a second drain 415b of the second switch 415 can be connected to the second capacitor 105b. Any other suitable arrangement of switches 113, 115 or number of switches is also contemplated herein.

In certain embodiments for certain applications such as two-level AC/DC power converters instead of the shown three-level AC/DC power converter in FIGS. 1, the midpoint line may not exist, and there may be only one DC link capacitor across two DC rails, and the protection switch 111 can be solely in series with the DC link capacitor. Any suitable arrangement that provides protection on the capacitor line is contemplated herein.

The power converter 100 and/or the protection circuit 111, 411 can further include a resistor line 117 connected at a first point 117a. As shown, the first point 117a can be between the first switch 113, 413 and the first capacitor 105a. The resistor line 117 can also be connected at a second point 117b. The second point 117b can be between the second switch 115, 415 and the second capacitor 105b, e.g., as shown.

The resistor line 117 can have a resistor 119 connected between the first point 117a and the second point 117b. The resistor 119 can be configured to absorb energy and provide ringing damping during a protection transient, for example. The resistor can also function as a pre-charging current limiting device during the normal start-up and pre-charging of the DC link capacitor. The resistor 119 can have a resistance value that is high enough to prevent short circuit flow through the resistance. Any other suitable resistance is contemplated herein. The resistor 119 can also function as a current limiting and speed limiting devices for the DC link pre-charging of a power converter during its normal start-up, and hence eliminate an extra external pre-charger circuit that is typically required and installed on a power converter.

Figure 2A:
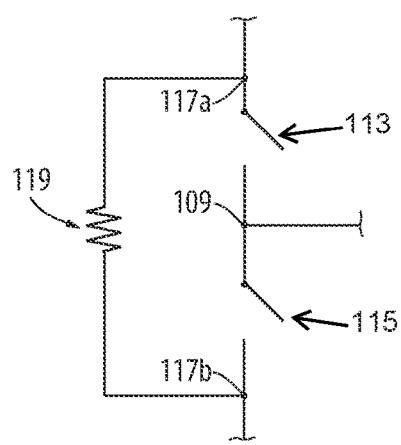
FIG. 2A is a circuit diagram of an embodiment of a protection circuit in accordance with this disclosure as shown in FIG. 1.
Figure 2B:
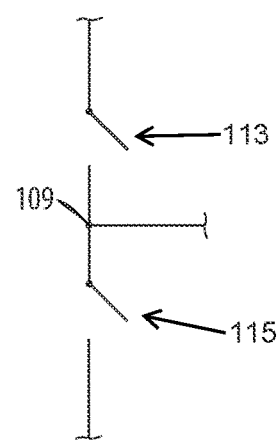
FIG. 2B is a circuit diagram of another embodiment of a protection circuit in accordance with this disclosure, shown without a resistor line.

FIGS. 2A and 5A show an embodiment of a protection circuit 111, 411 utilized in the embodiments of FIGS. 1 and 4. FIGS. 2B and 5B show an alternate embodiment of a protection circuit 211, 511 that does not include the resistor line or resistor as disclosed above.

Figure 2C:
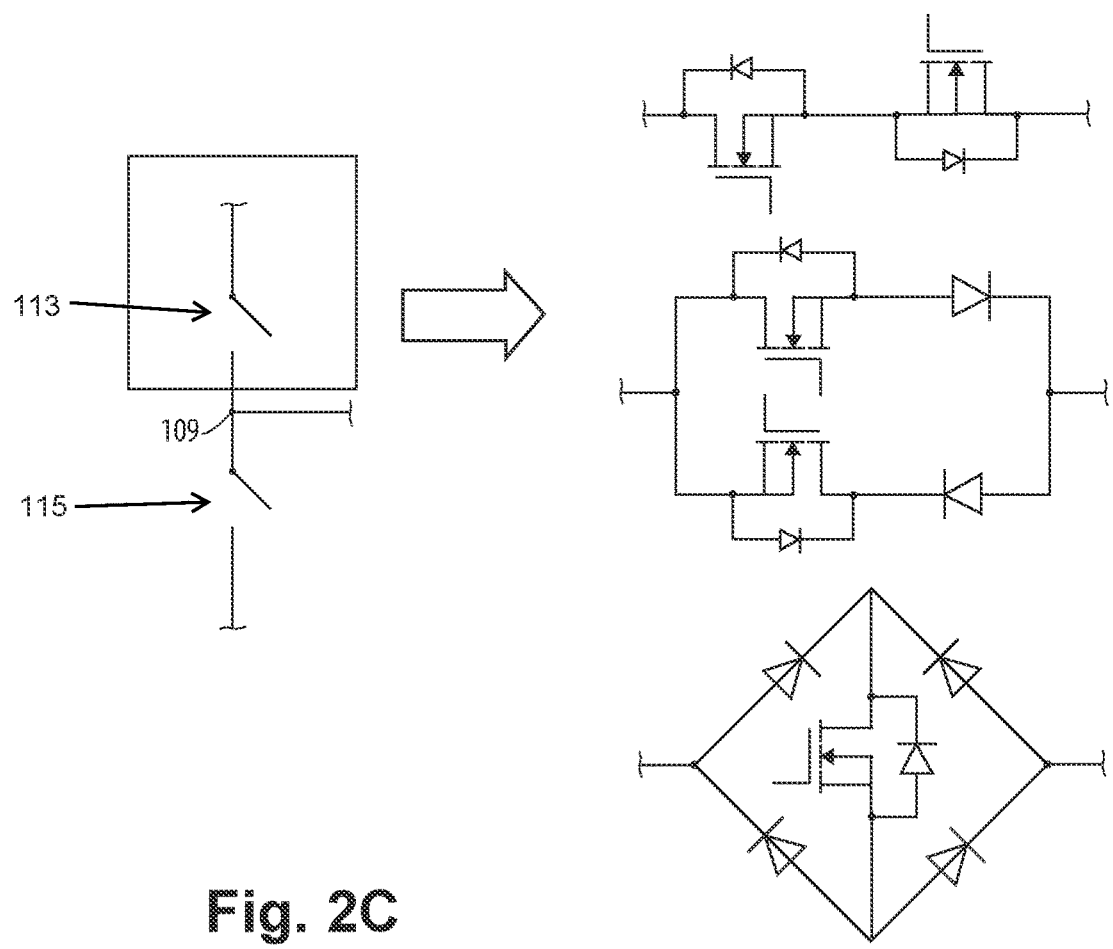
FIG. 2C is a circuit diagram of certain embodiments of a switch in the protection circuit with the bidirectional switches in accordance with this disclosure.
Figure 5C:
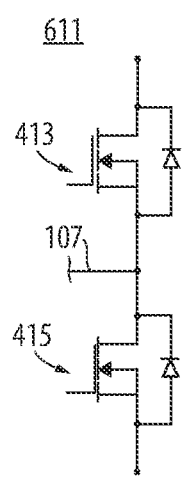
FIG. 5C is a circuit diagram of a half bridge embodiment that is similar to the protection circuit in FIG. 5B, shown having the switches in a reversed polarity/direction.

FIG. 2C shows example embodiments of a switch in the protection circuit 111, 411. As shown, FIG. 2C illustrates three types of bidirectional devices formed by MOSFET and/or diodes are adopted giving the full protection functions. FIG. 5C shows a half bridge embodiment that is similar to the embodiment of the protection circuit 311 in FIG. 5B, but has the switches connected in reverse polarity (sources and drains flipped).

In certain embodiments, the first line 101a can be a positive DC rail, the second line 101b can be a negative DC rail, and the capacitor line 103 can be a DC link capacitor line for an inverter or rectifier (e.g., for an electric motor system as shown). In certain embodiments, the power converter 100 is a DC/AC inverter or AC/DC rectifier. Any other suitable power converter type is contemplated herein. While a single phase circuit is expressly shown in FIG. 1 connected to the capacitor line 103 (e.g., DC link), any number of phases are contemplated herein to connect to the capacitor line 103 and three phases 121a, 121b, 121c are shown schematically in FIG. 1 connected to a motor 123.

In certain embodiments, the power converter 100 can include a control module 125 configured to monitor for and/or sense an overvoltage and/or short circuit/shoot-through, and to control the first switch 113, 413 and the second switch 115, 415 accordingly to provide protection. The control module 125 can include any suitable hardware and/or software module(s) configured to perform any suitable function (e.g., as disclosed herein). The connection lines to the control module 125 are not shown in FIG. 1 for clarity. For example, the control module 125 can sense a short circuit or other problem in a portion of the power converter 100 and can simultaneously open both switches 113, 115 or 413, 415 and also disable all other switches of the power converter, e.g., as shown in FIGS. 3A-3D and FIGS. 6A-6D.

Figure 3A:
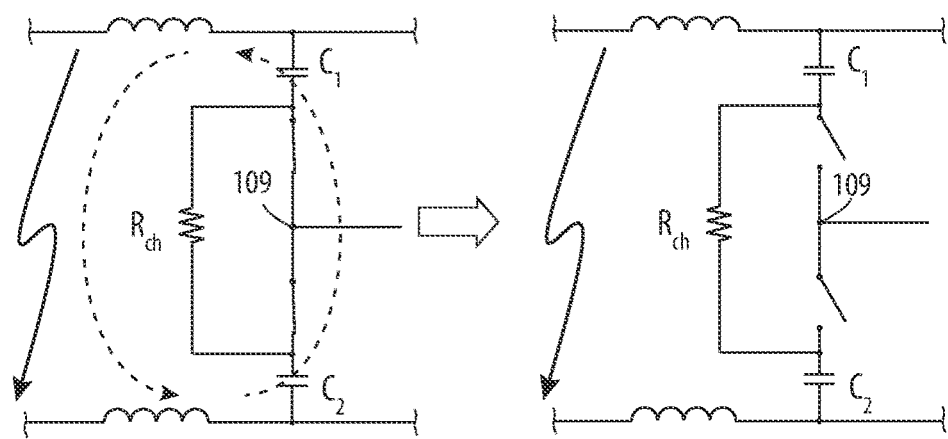
FIG. 3A shows a transition from an embodiment of a short circuit between a first leg and a second leg, and an embodiment of a resulting reaction of the embodiment of the protection circuit of FIGS. 1 and 2A.
Figure 3B:
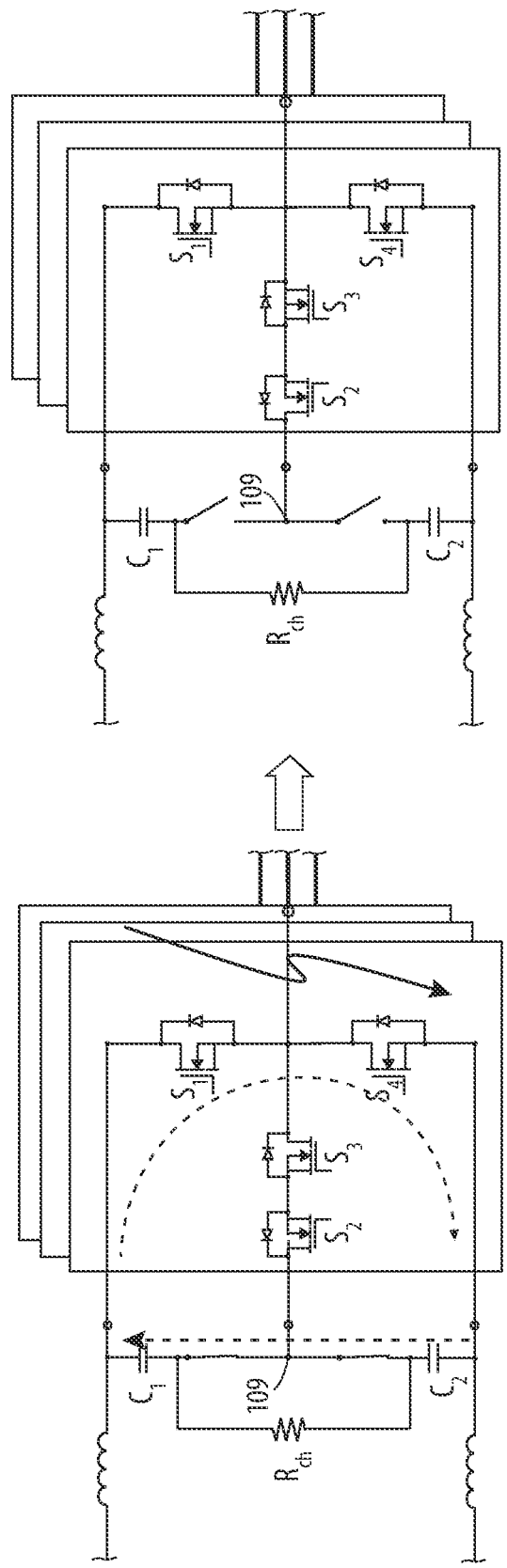
FIG. 3B shows a transition from an embodiment of a converter bridge shoot-through or short circuit, and an embodiment of a resulting reaction of the embodiment of the protection circuit of FIGS. 1 and 2A.
Figure 3C:
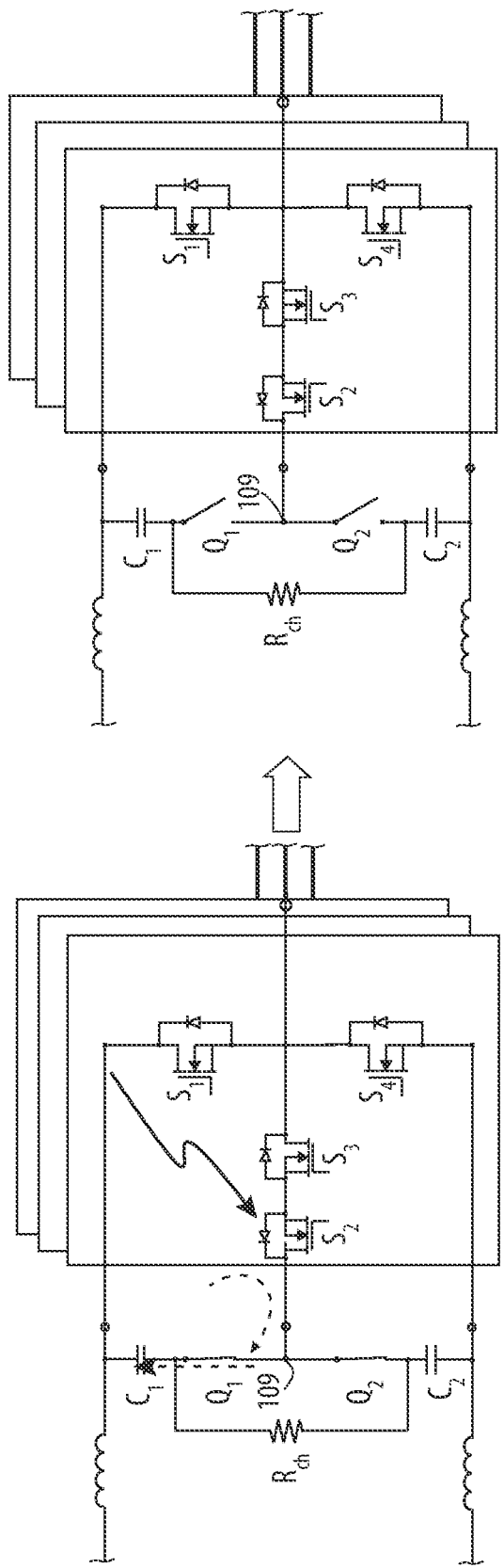
FIG. 3C shows a transition from an embodiment of an upper phase shoot-through or short circuit, and an embodiment of a resulting reaction of the embodiment of the protection circuit of FIGS. 1 and 2A.
Figure 3D:
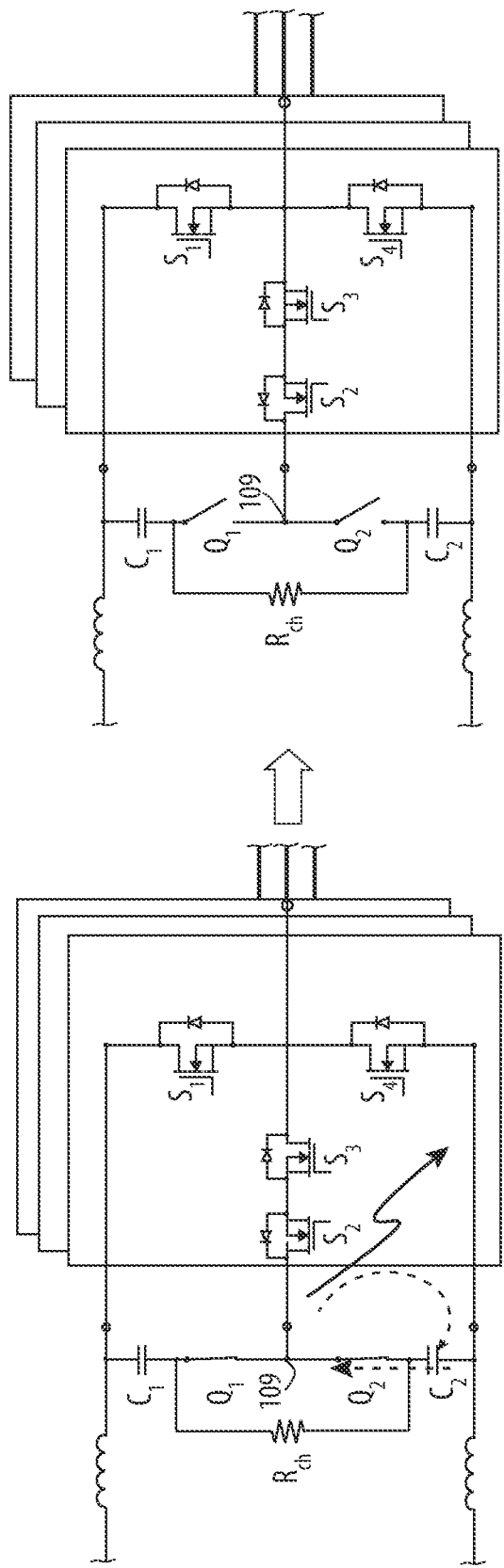
FIG. 3D shows a transition from an embodiment of a bottom phase shoot-through or short circuit, and an embodiment of a resulting reaction of the embodiment of the protection circuit of FIGS. 1 and 2A.
Figure 3E:
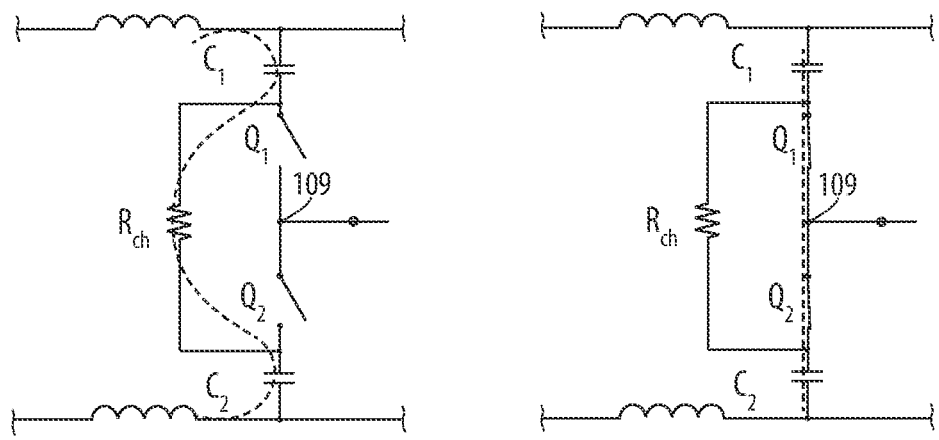
FIG. 3E shows a transition from an embodiment of a DC link capacitor pre-charing of a power converter, and an embodiment of a resulting reaction of the embodiment of the multi-functional protection circuit of FIGS. 1 and 2A.
Figure 6A:
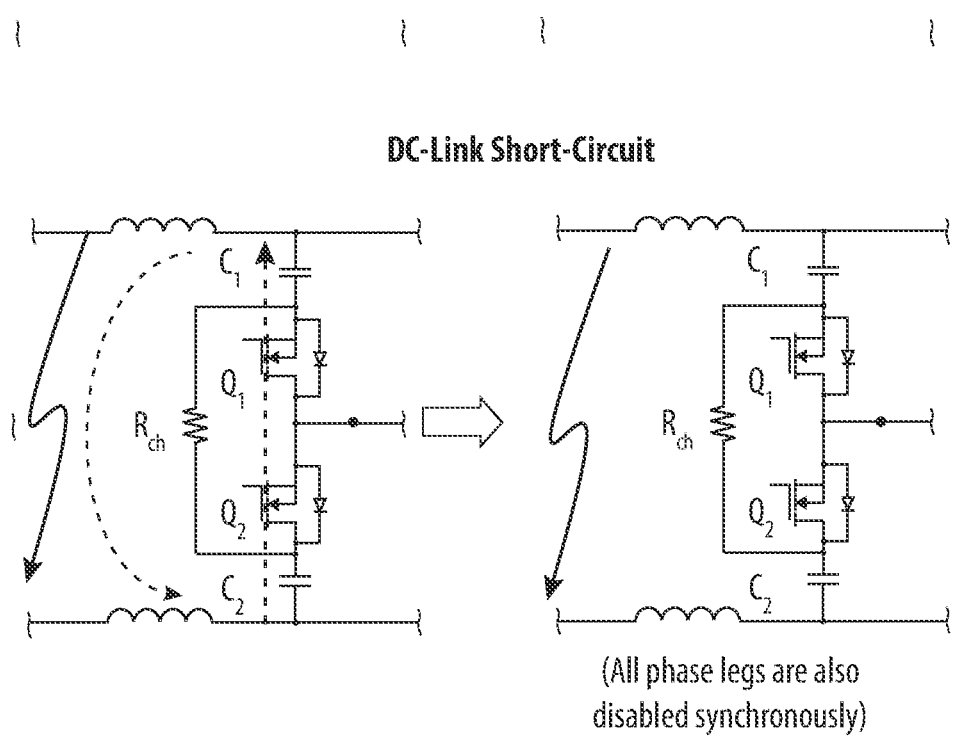
FIG. 6A shows a transition from an embodiment of a short circuit between a first leg and a second leg, and an embodiment of a resulting reaction of the embodiment of the protection circuit of FIGS. 4 and 5A.
Figure 6B:
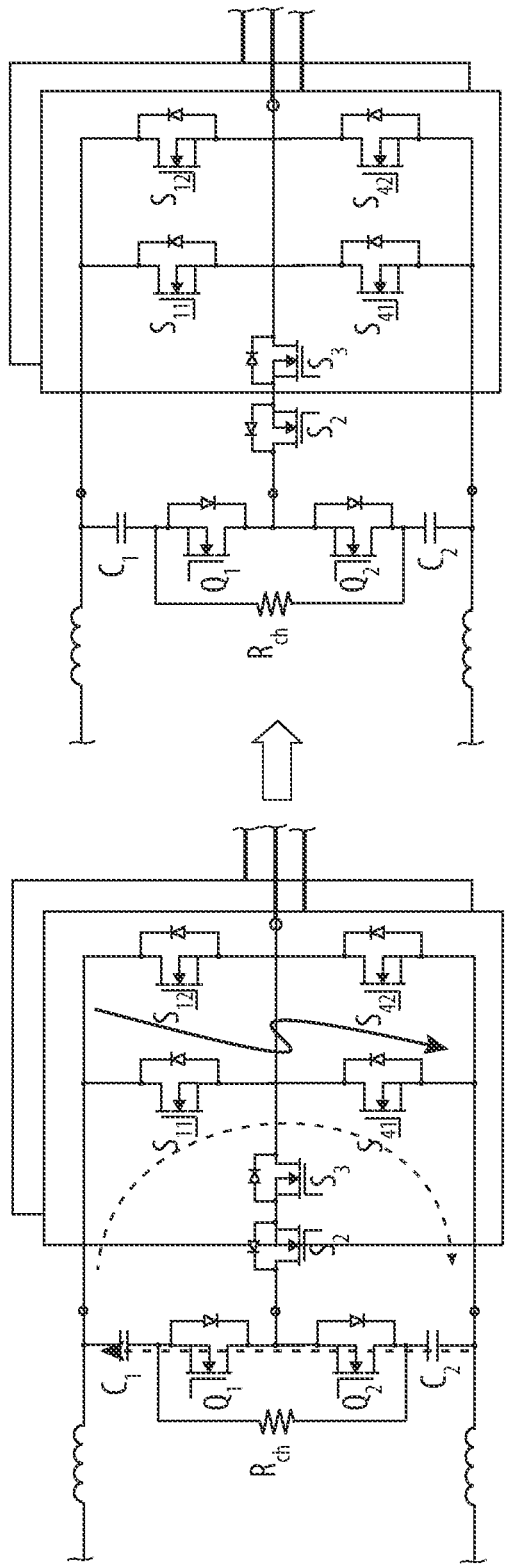
FIG. 6B shows a transition from an embodiment of a converter bridge shoot-through or short circuit, and an embodiment of a resulting reaction of the embodiment of the protection circuit of FIGS. 4 and 5A.
Figure 6C:
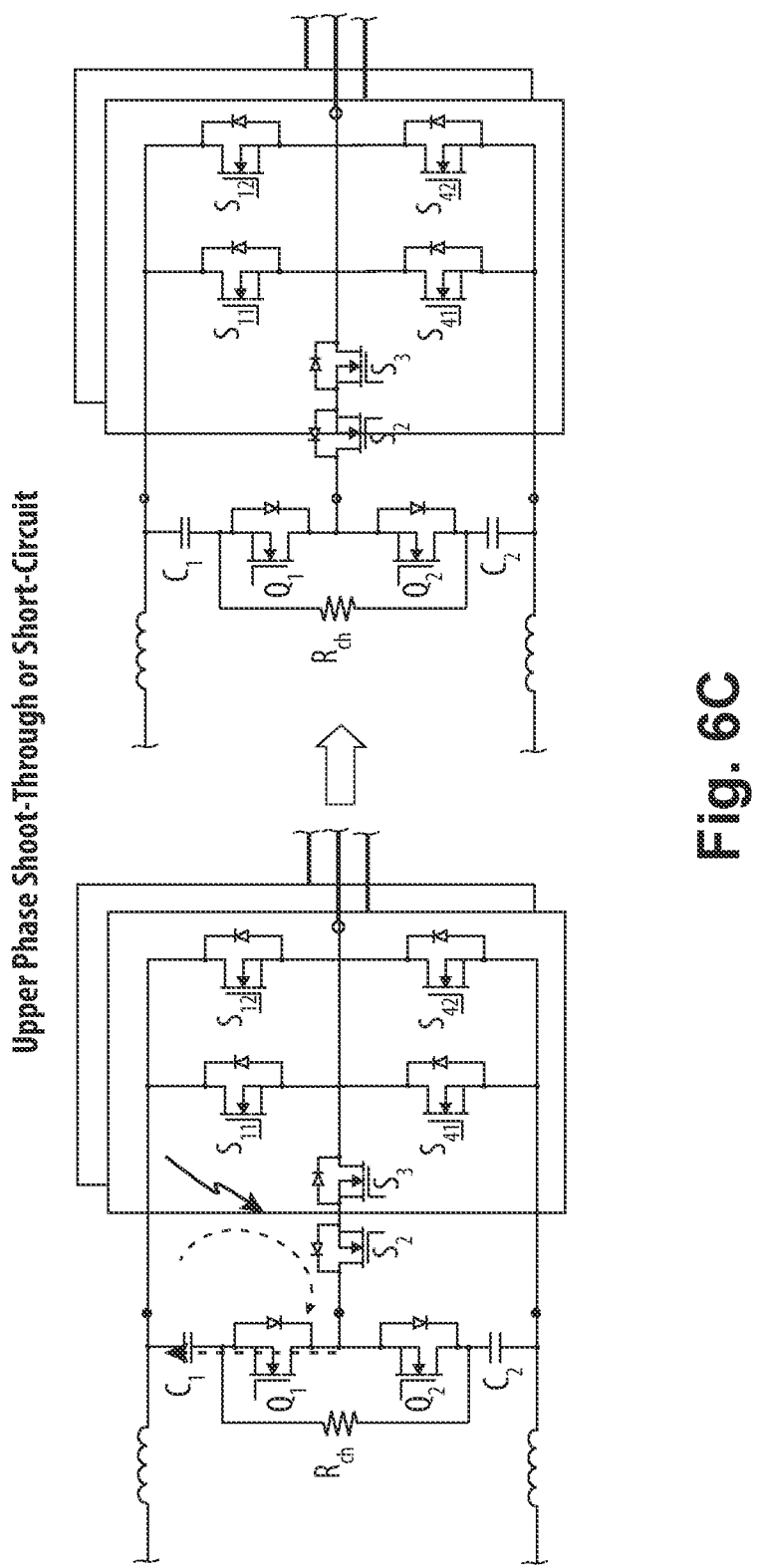
FIG. 6C shows a transition from an embodiment of an upper phase shoot-through or short circuit, and an embodiment of a resulting reaction of the embodiment of the protection circuit of FIGS. 4 and 5A.
Figure 6D:
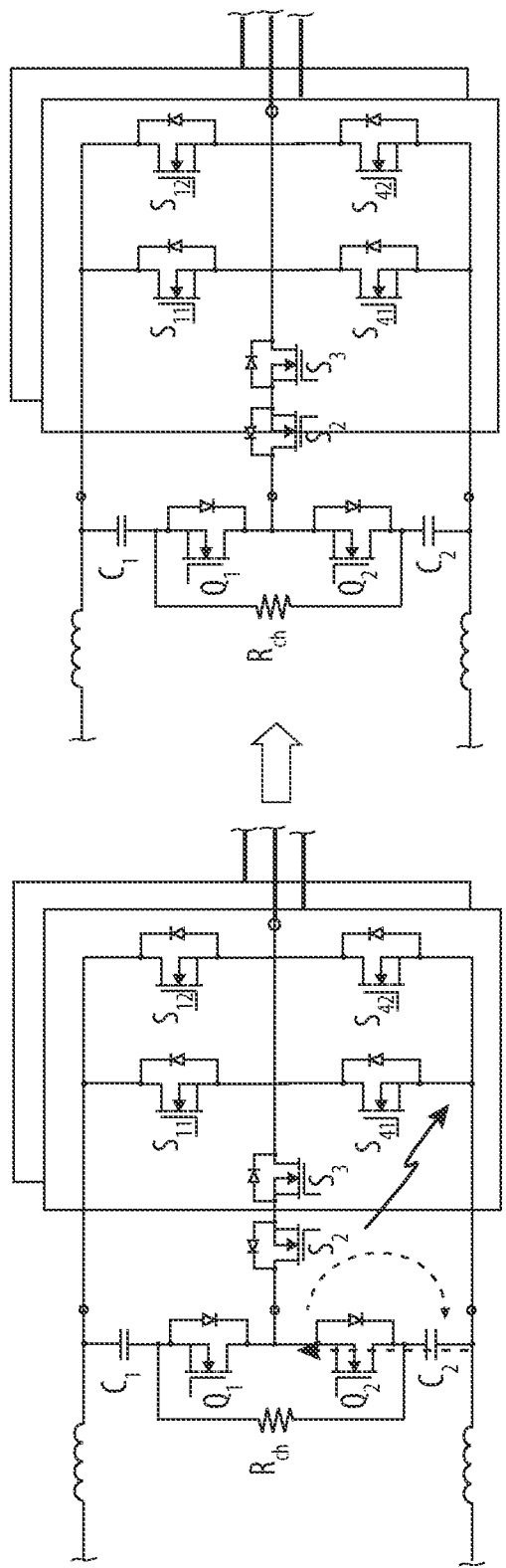
FIG. 6D shows a transition from an embodiment of a bottom phase shoot-through or short circuit, and an embodiment of a resulting reaction of the embodiment of the protection circuit of FIGS. 4 and 6A.

FIGS. 3A and 6A show a transition from an embodiment of a short circuit between a first leg and a second leg, and an embodiment of a resulting reaction of the respective protection circuit. FIGS. 3B and 6B show a transition from an embodiment of a converter bridge shoot-through or short circuit, and an embodiment of a resulting reaction of the respective protection circuit. FIGS. 3C and 6C show a transition from an embodiment of an upper phase shoot-through or short circuit, and an embodiment of a resulting reaction of a respective protection circuit. FIGS. 3D and 6D show a transition from an embodiment of a bottom phase shoot-through or short circuit, and an embodiment of a resulting reaction of the embodiment of a respective protection circuit. Any suitable control to provide protection (e.g., opening only a single switch on the same side as the short circuit, i.e., upper or bottom) is contemplated herein.

In accordance with at least one aspect of this disclosure, a method for providing overvoltage or short circuit protection to a power converter can include sensing an overvoltage or short circuit in at least one portion of the power converter, and opening one or more switches disposed between a plurality of DC link capacitors on a DC link capacitor line in response to the overvoltage or short circuit. Opening one or more switches can include simultaneously opening two switches, a first switch located on a first side of a midpoint of the DC link capacitor line between the plurality of DC link capacitors, and a second switch located on a second side of the midpoint between the plurality of DC link capacitors. Embodiments can isolate the energy source, e.g., the DC link capacitors within the power converter from the other components of the converter, during abnormal conditions. The method can include any other suitable method(s) and/or portion thereof. The method can be embodiment in computer readable instructions stored on a non-transitory computer readable medium, for example (e.g., within the controller 125).

In accordance with at least one aspect of this disclosure, a power converter can include a first line, a second line, a capacitor line disposed between the first line and the second line, at least a first capacitor connected to the capacitor line in series between the first line and the second line, and a protection circuit disposed between the first capacitor and the second line and configured to provide protection to one or more portions of the power converter. The power converter can include a second capacitor disposed on the capacitor line, and a midpoint line connected to a midpoint between the first capacitor and the second capacitor.

Embodiments can include selective functioning scenarios. The first switch 113, 413 and the second switch 115, 415 can be controlled by a control module 125 that is configured to sense currents/voltages and drive gates of the switches 113, 115 or 413, 415 accordingly, e.g., as shown. Any suitable sensors (e.g., voltage and/or current sensors) and logic/controllers for protection are contemplated herein to provide any suitable reaction speed, e.g., 1 or 2 microseconds.

Embodiments can provide a protection circuit for power converter, and converters having such circuits. Embodiments Proposed multi-functional protection circuit: for pre-charge, various short-circuits, and dc capacitor overvoltage Certain embodiments can utilize a module with two bidirectional switches configured in a half-bridge manner and also a connection to a DC-midpoint, or a half-bridge MOSFET module reversely connected to two DC-capacitors and also to a DC-midpoint. In normal operation, the first switch 113, 413 and second switch 115, 415 can be on (closed), and can operate as a synchronous rectifier (SR) MOSFET when capacitor current is negative (lower conduction loss). In the event of any short-circuit faults or capacitor overvoltage, the first switch 113, 413 and second switch 115, 415 can be switched off, e.g., simultaneously.

Embodiments can provide DC-link short circuit fault or bridge-leg shoot through protection, upper leg shoot through or short-circuit protection, bottom leg shoot through or short-circuit protection, and capacitor overvoltage (for whole dc-link or one capacitor due to switch failures). Embodiments can provide a one-for-all protection, such that none of any main devices in each phase leg need its own current protection circuit such as Desaturation (DESAT) circuit, for example, and all share a common protection circuit (e.g., first switch 113, 413 and second switch 115, 415) and its DESAT or other current sensing circuit and DC-link capacitor overvoltage detections (using resistor dividers, for example). Therefore, all phase legs can be protected accordingly.

If first switch 113, 413 and second switch 115, 415 are designed with series turn-off gate driving capability, both switches can be turned-off simultaneously. Hence, the device voltage stress can be reduced by half (i.e. Vdc/2 instead of Vdc). One having ordinary skill in the art in view of this disclosure appreciates the gate driving technologies for series connection of IGBT and SiC MOSFET. The two protection devices can be packaged in one power module to reduce the leakage inductance, and hence impose less impact on the commutation loop inductance of the main converter during its normal operation.

Packaging the protection devices as a module also allows better symmetries to ease their series connection. Packaging the proposed circuit with the main power devices sharing the common bus bar and coldplate/heastsink can further improve the power density and reduce the overall size, and can reduce the commutation loop inductance of the main converter. In additional to device protections mentioned above, embodiments can prevent DC-link capacitors from intensive discharging and damage during the short-circuit faults. The protection is helpful to reduce the overall DC-side short circuit fault current. Once the major peak current from DC capacitors are prevented, the remaining current from the AC side is lower (e.g., because AC motor back EMF contributes lower fault current and lower current rising rate due to higher inductive impedance on the motor winding, cables, and dv/dt filter, as well as EMI filter). Hence, embodiments can allow use of a low rating DC circuit breaker on the converter side (e.g., reducing size and weight). Embodiments can be utilized for other 3-level, 5-level, or more-level converters, and not only for DC/AC or AC/DC, but also for DC/DC converters for example.

The shown embodiment illustrates a three-level converter example. The number of devices paralleled per half-bridge phase leg and the number of phase legs can be varied. Any suitable number of phases/levels is contemplated herein. It is noted that a DC/AC inverter and AC/DC rectifier are identical from the circuit topology aspect, with the main difference being in the control target. Short-circuit protection time for SiC module can be about 2 microsecond.

Embodiments can provide a multi-functional protection circuit for power converter that can be integrated with the main converter for higher performance and power density. Embodiments can be based on a two direction switches plus a parallel charging/discharging resistor embedded in the DC-link capacitor branch that provides multi-function, including, e.g., protection capability for various faults, overvoltage or short circuit protection during and after fault, DC-link pre-charging for converter start-up, modular and expansive for many multilevel AC/DC or DC/DC converters. Embodiments can also be a reversed half-bridge structure for overcurrent protections for various short-circuit faults.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A power converter, comprising:
a first line;
a second line;
a capacitor line disposed between the first line and the second line;
a first capacitor and a second capacitor connected to the capacitor line in series between the first line and the second line;
a midpoint line connected to a midpoint between the first capacitor and the second capacitor;
a protection circuit disposed between the first capacitor and the second capacitor and configured to provide protection to one or more portions of the power converter, wherein the protection circuit includes a first switch and a second switch connected in series between the first capacitor and the second capacitor; and
a control module connected to the first and second switches to control the first and second switches, wherein the control module is configured to open the first and second switches simultaneously.

2. The power converter of claim 1, wherein the midpoint line is connected to the capacitor line between the first switch and the second switch.

3. The power converter of claim 2, wherein the first switch and second switch are MOSFETs.

4. The power converter of claim 3, wherein a first source of the first switch is connected to the first capacitor, wherein a first drain of the first switch is connected to the midpoint and the second switch.

5. The power converter of claim 4, wherein a second source of the second switch is connected to the midpoint and the first switch, wherein a second drain of the second switch is connected to the second capacitor.

6. The power converter of claim 5, further comprising a resistor line connected at a first point, the first point being between the first switch and the first capacitor, and connected at a second point, the second point being between the second switch and the second capacitor, the resistor line having a resistor connected between the first point and the second point.

7. The power converter of claim 6, wherein the resistor is configured to absorb energy and provide ringing damping during a protection transient.

8. The power converter of claim 6, wherein the first line is a positive DC rail, wherein the second line is a negative DC rail, wherein the capacitor line is a DC link capacitor line for an inverter or rectifier.

9. The power converter of claim 1, wherein the power converter is a DC/AC inverter or AC/DC rectifier.

10. A power converter, comprising:
a first line;
a second line;
a capacitor line disposed between the first line and the second line;
a first capacitor and a second capacitor connected to the capacitor line in series between the first line and the second line;
a midpoint line connected to a midpoint between the first capacitor and the second capacitor;
a first switch and a second switch connected in series between the first capacitor and the second capacitor; and
a control module connected to the first and second switches to control the first and second switches, wherein the control module is configured to open the first and second switches simultaneously.

11. The power converter of claim 10, further comprising a midpoint line connected to the capacitor line between the first switch and the second switch.

12. The power converter of claim 11, wherein the first switch and second switch are MOSFETs.

13. The power converter of claim 12, wherein a first source of the first switch is connected to the first capacitor, wherein a first drain of the first switch is connected to the midpoint and the second switch.

14. The power converter of claim 13, wherein a second source of the second switch is connected to the midpoint and the first switch, wherein a second drain of the second switch is connected to the second capacitor.

15. The power converter of claim 14, further comprising a resistor line connected at a first point, the first point being between the first switch and the first capacitor, and connected at a second point, the second point being between the second switch and the second capacitor, the resistor line having a resistor connected between the first point and the second point.

16. A method for providing overvoltage or short circuit protection to a power converter, comprising:
sensing an overvoltage or short circuit in at least one portion of the power converter; and
opening one or more switches disposed between a plurality of DC link capacitors on a DC link capacitor line in response to the overvoltage,
wherein opening one or more switches includes simultaneously opening two switches including a first switch located on a first side of a midpoint of the DC link capacitor line between the plurality of DC link capacitors, and a second switch located on a second side of the midpoint between the plurality of DC link capacitors.

* * * * *